Figure 1:
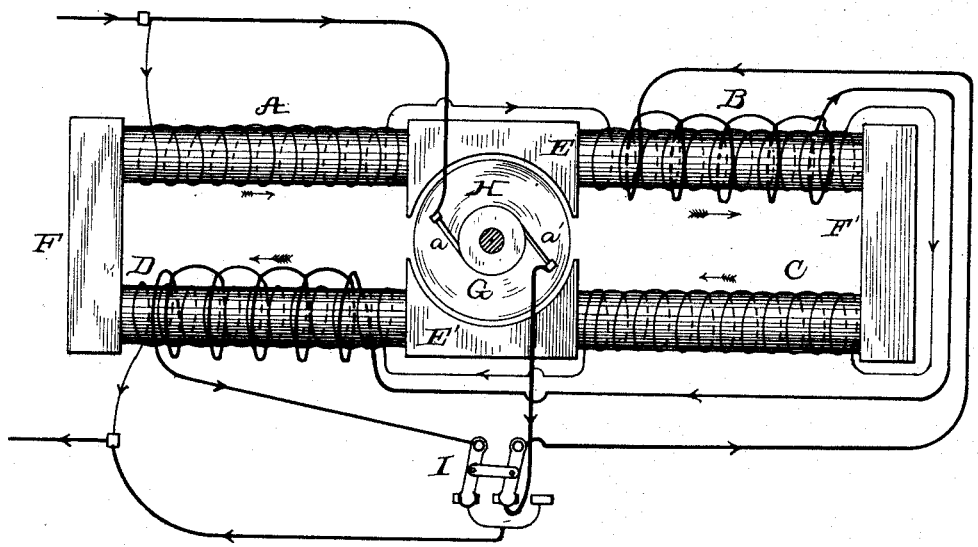

(No Model.)  3 Sheets—Sheet 1.

F. J. SPRAGUE.
ELECTRIC MOTOR AND GENERATOR.

No. 428,732.  Patented May 27, 1890.

ATTEST:

INVENTOR:
Frank J. Sprague
By Dyer & Shelly
Attys (No Model.) 3 Sheets—Sheet 2.

F. J. SPRAGUE.
ELECTRIC MOTOR AND GENERATOR.

No. 428,732. Patented May 27, 1890.

ATTEST:
E. L. Rowland
T. G. Greene Jr.

INVENTOR:
Frank J. Sprague
By Dyer & Seely
Attys (No Model.) 3 Sheets—Sheet 3.

F. J. SPRAGUE.
ELECTRIC MOTOR AND GENERATOR.

No. 428,732. Patented May 27, 1890.

WITNESSES:
Norris A. Clark
Richard C. Laurie

INVENTOR:
Frank J. Sprague
By Dyer & Seely
Attys.

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY, OF NEW YORK.

ELECTRIC MOTOR AND GENERATOR.

SPECIFICATION forming part of Letters Patent No. 428,732, dated May 27, 1890.

Application filed July 19, 1884. Serial No. 138,145. (No model.)

*To all whom it may concern:*

Be it known that I, FRANK J. SPRAGUE, of New York, in the county and State of New York, have invented a certain new and useful Improvement in Electric Motors and Generators, of which the following is a specification.

In the operation of all electro-dynamic motors and dynamo-electric generators there has heretofore existed this difficulty, that the non-sparking points on the commutator-cylinder are subject to constant change. It being necessary to maintain the commutator-brushes at these points, such brushes have to be constantly shifted.

Many automatic devices more or less complicated have been devised for maintaining the brushes at the non-sparking points. By my invention I am enabled to do away entirely with such devices by so constructing the machine that the non-sparking points will be always the same, and the position of the brushes will consequently never have to be changed.

My invention was designed especially with reference to electro-dynamic motors, and I shall therefore describe it more particularly with reference thereto. It is, however, applicable also to dynamo-electric generators, as I shall explain.

The magnetic field of an electro-dynamic motor has two sources—one the field-magnet, which has a certain polarity, the other the armature, which has a polarity nearly at right angles thereto. The combination of these two produces a field of force which is more or less distorted, and since every variation of load is attended by a variation of the magnetic moment of both field and armature there must always be a corresponding variation of the resultant of the two magnetic moments or the position of parallel cutting of the lines of force by the armature-coils. It is this position of parallel cutting which determines the positions of least sparking, and hence it is from this change thereof with every variation of load that the necessity for the constant shifting of the brushes arises.

By my invention I oppose the distortion of the field caused by variations of load by a counter-distortion, so that the magnetic resultant and position of parallel cutting are unchanged.

The motor which I use is a differential motor—that is, one having two opposing sets of field-coils, one in series, the other in shunt relation to the armature. Such motors may be used either with a constant-potential circuit or a constant-current circuit. In either case the main or shunted coil may be shunted around either the armature alone or both the armature and the differential or governing coil in series therewith.

In a motor the change of set of the brushes from the normal position for an increased current is called a "negative lead," it being in a direction contrary to the direction of rotation. An increase of load is attended by a weakening of the field and an increase of armature-current; hence the greater the load the greater the negative lead. When there is no load, there is practically no distortion or lead.

The counter-distortion is in all cases dependent primarily upon the variations of armature-current. For a constant potential motor, with the series coil inside the shunt terminals, it is produced by the effect of such variations upon the series coil. With the series coil outside it is produced chiefly by this and also by the change in the shunt-coil due to the fall of potential at one or both terminals of the shunt field-coils, and this distortion is so proportioned that the mean magnetic resultant of the fields, produced by the field-magnet and the armature, remains unchanged, and hence there is no shifting of the non-sparking point, and no readjustment of the brushes is ever necessary, except for wear.

I prefer to apply my invention to those motors having field-magnet cores extending in different directions from the pole-pieces, or those in which the two free poles of the field are each in reality the combination of two or more other poles. It is evident that if all of the cores in this arrangement are equally magnetic the field will be normal and symmetrical; but if two cores diagonally situated are of different magnetic moment from the other two the field will be distorted. It is by such unequal proportioning of the magnetic moment of the cores that I produce my counter-distortion of the field.

In carrying my invention into effect the main or shunt coil is preferably wound equally upon all four cores of the magnet, enveloping the whole or a part of each, while the series or differential coil, which is of coarser wire, may be wound wholly on two cores diagonally opposite each other, or so that it exerts a greater magnetizing effect on such two cores than it does on the other two.

Now when there is no load on the motor and no armature-current the magnetic resultant and position of the points of least spark are due entirely to the field-magnet; but when load is placed on the machine and the armature-current begins to flow this field would be distorted and the non-sparking points would be changed were it not that the increase of armature-current increases the magnetic moment of the unsymmetrically-wound series coil, at the same time weakening the whole field, and this tends to make a counter-distortion in the opposite direction, and the position of the non-sparking points remains unchanged. This action is similar whether the differential coil is inside or outside the terminals of the main field shunt.

By proportioning the resistance and number of turns of the shunt and series coils in a manner which is set forth in my applications Serial Nos. 138,146 and 138,147 the motor may be made to run at constant speed under varying loads in either a constant-potential or a constant-current circuit.

It is evident that the arrangements above described are readily applicable to dynamo-electric generators either for constant current or constant potential. In such the lead is ordinarily reversed from that in the motor; but the shifting of the field is of opposite character, so that the position necessary for the brushes is still unchanged.

My invention is illustrated in the annexed drawings, in which—

Figure 4:
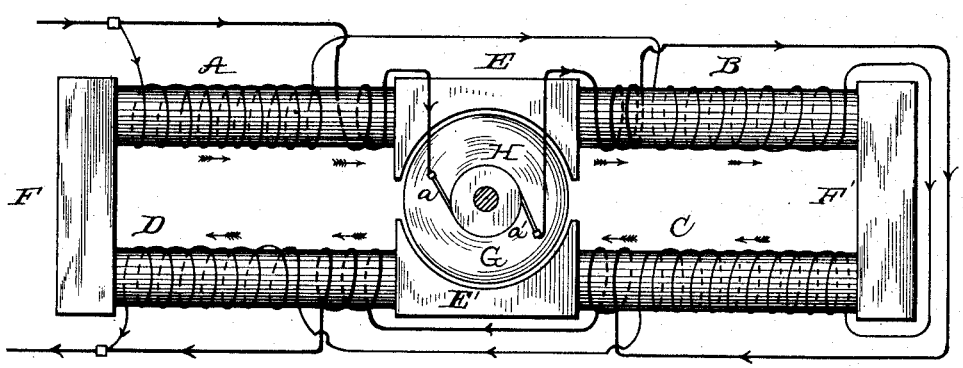
Figure 5:
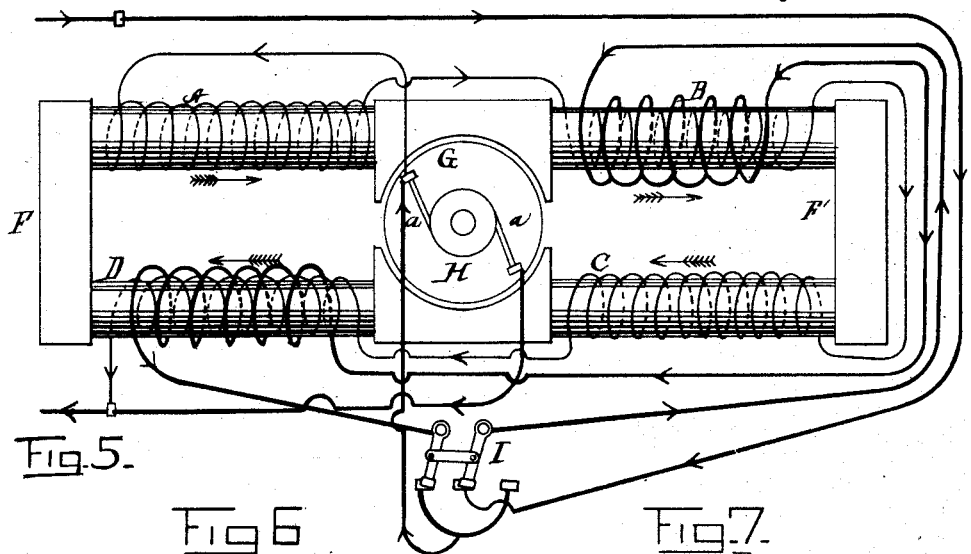
Figure 6:
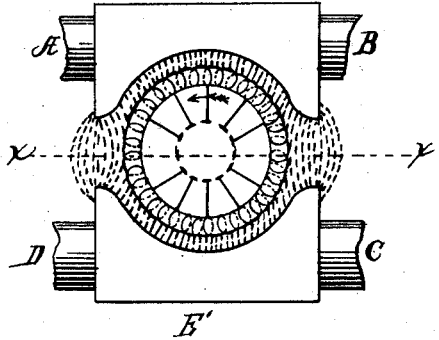
Figure 7:
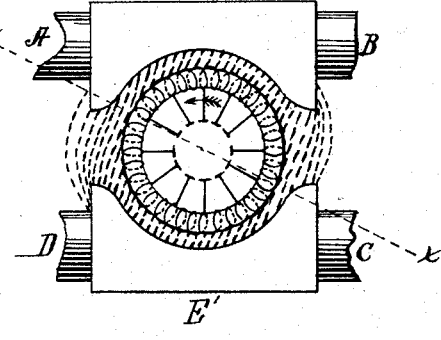
Figure 8:
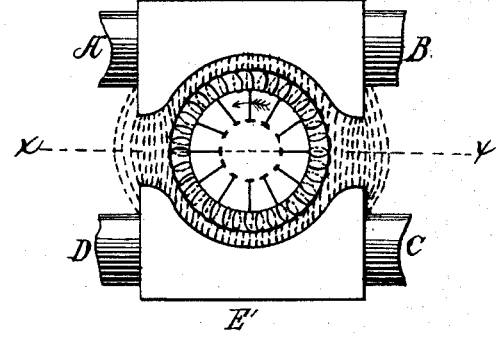

Figures 1 to 5, inclusive, are diagrams of motors arranged and wound in the several different ways above set forth; and Figs. 6, 7, and 8 illustrate the distortion of the lines of force under the different conditions.

Like letters refer to corresponding parts in all these figures.

A B C D are field-magnet cores of a motor having yokes or back pieces F F and extending in different directions from the pole-pieces E E.

G is the armature, H the commutator-cylinder, and $a$ $a'$ the commutator-brushes. The series coil is in heavy lines, and the shunt-coil in lighter lines.

I is a short-circuiting and reversing switch for the series coil, the function of which will be presently explained.

The direction of the currents is indicated by the arrows. The armature in all cases revolves toward the left.

I will describe each of the figures in detail.

Fig. 1 is a constant-potential machine with the fine coil shunted around both the armature and the coarse coil. Such coarse or differential coil is wound entirely upon the two diagonally-opposite cores B and D. It is evident that an increased load, producing an increased armature-current, will weaken the effect of cores B and D and shift the magnetic-resultant line to the left.

In this connection refer to Figs. 6, 7, and 8. In these figures a Gramme ring is shown for the armature for convenience of illustration. The dotted lines crossing the inter-polar space represent the lines of force of the magnetic field. Dotted line $x$ $x$ is the line of neutrality or magnetic resultant, on which the brushes are set at the points of least spark.

In Fig. 6 there is a normal field, no load, and no armature-current.

Fig. 7 shows a distorted field, caused by the placing of a load on the motor and the flowing of current in the armature. The line $x$ $x$ is shifted to the right; but if the cores A C are stronger than the cores B D, as above explained, and the preponderance of strength depends upon the armature-current, as it evidently will, there will be an opposing and balancing tendency for this line to shift to the left, and consequently everything will remain, as seen in Fig. 8, precisely the same as in Fig. 6.

Figure 2:
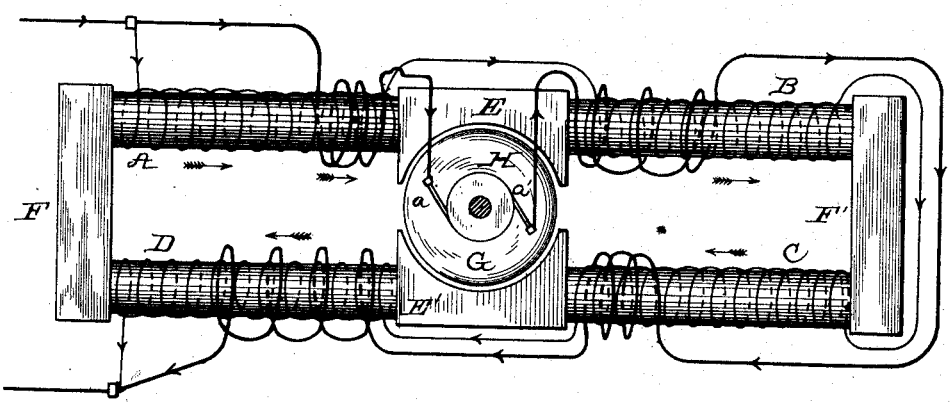

Fig. 2 is the same as Fig. 1, except that the differential coil is wound on all the cores, predominating, however, on cores B and D. An increase of armature-current weakens the whole field, but tends to shift the magnetic resultant to the left, as before.

Figure 3:
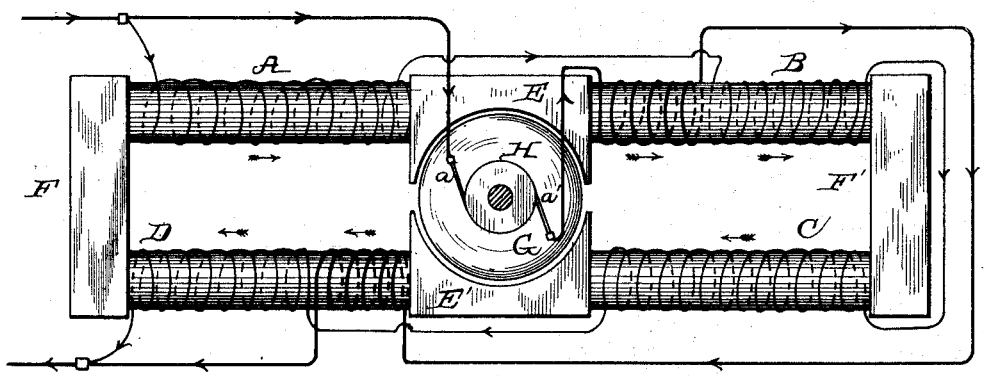

In Fig. 3 the effect is the same as in Fig. 1, though the winding is somewhat different. The main or shunt coil covers a part only of cores B and D, and on the remaining part of each the differential coil is wound.

In Fig. 4 the effect is the same as in Fig. 2. Each coil covers a part of each core, the differential coil predominating on cores B and D, as in the previous cases.

In Fig. 5 the differential coil is outside the terminals of the main field-shunt—that is, the main field-coils are shunted around the armature alone. An increase of load weakens the field by weakening the main coil and strengthening the series coil, and the strengthening of such series coil produces the necessary counter-distortion of the field.

The switch I (shown in several of the figures) is used to short-circuit or reverse the differential series coil, for the proportions which I propose to use for the winding are such, as will be explained in another application, that a zero field, or nearly so, will be produced when the machine is started; but by using the switch to short-circuit or reverse the differential coil either such coil will not act at all or its effect will be added to the main coil, and therefore the motor will start with a strong field.

This device is described thus briefly, and is not claimed herein, because it will form part of the proposed application just referred to.

I do not claim in this application the method above described of preventing sparking at the commutator-brushes by producing a counter-distortion of the magnetic field. This method will form the subject of a separate application.

What I claim is—

1. A differentially-wound electric motor or generator having field-magnet cores extending in different directions from the pole-pieces, and having one set of field-coils wound uniformly on all said cores and the other set wound so as to exert a greater influence on diagonally-opposite parts of the magnet than it does on the other parts, substantially as set forth.

2. A differentially-wound electric motor or generator having field-magnet cores extending in different directions from the pole-pieces, and having one set of field-coils wound on all said cores and the other on diagonally-opposite parts only, substantially as set forth.

This specification signed and witnessed this 19th day of June, 1884.

FRANK J. SPRAGUE.

Witnesses:
H. W. SEELY,
T. G. GREENE, Jr.